Jan. 20, 1959 — C. C. BROWN — 2,869,644
WASHOVER TOOL FOR USE IN WELLS
Filed May 31, 1955

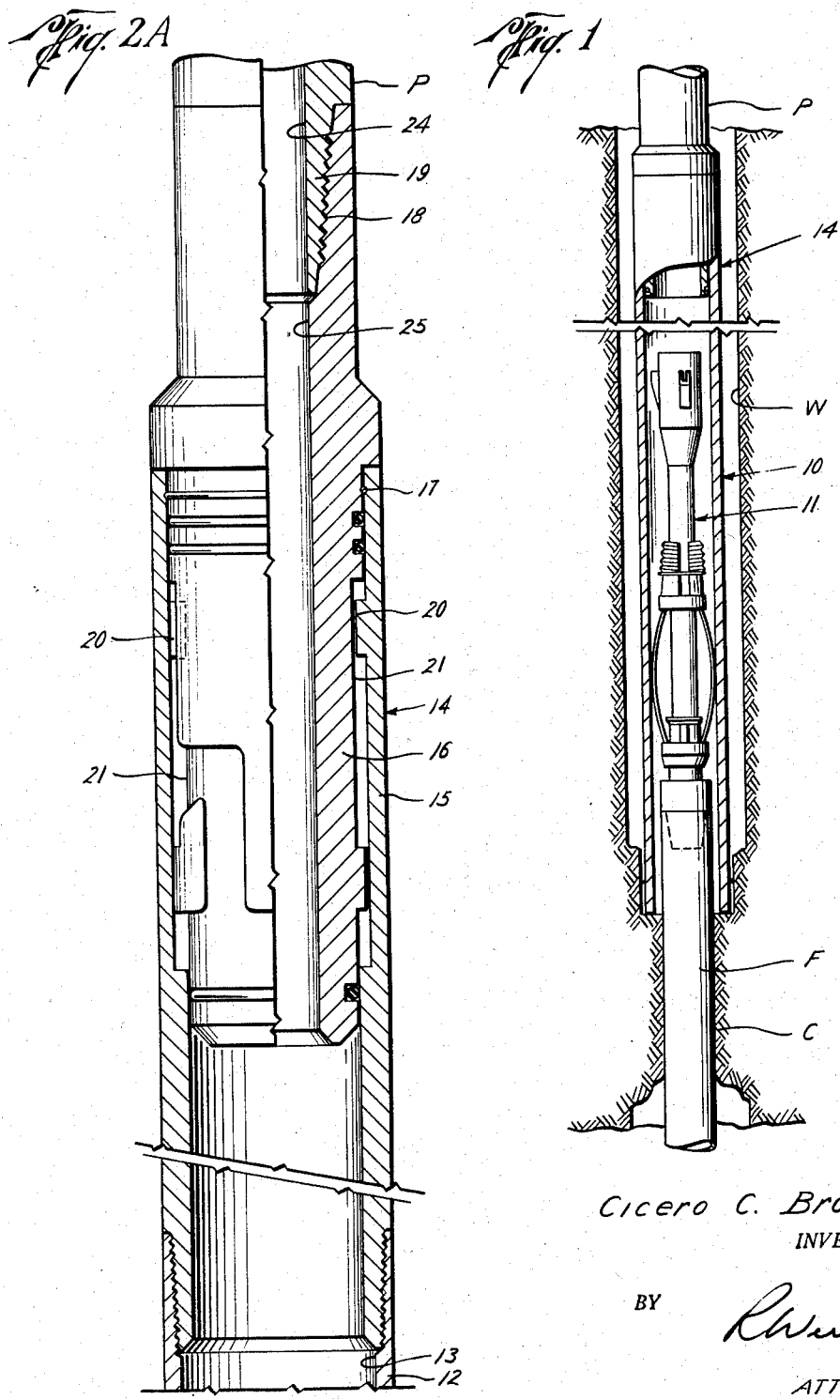

Cicero C. Brown
INVENTOR.

BY

ATTORNEY

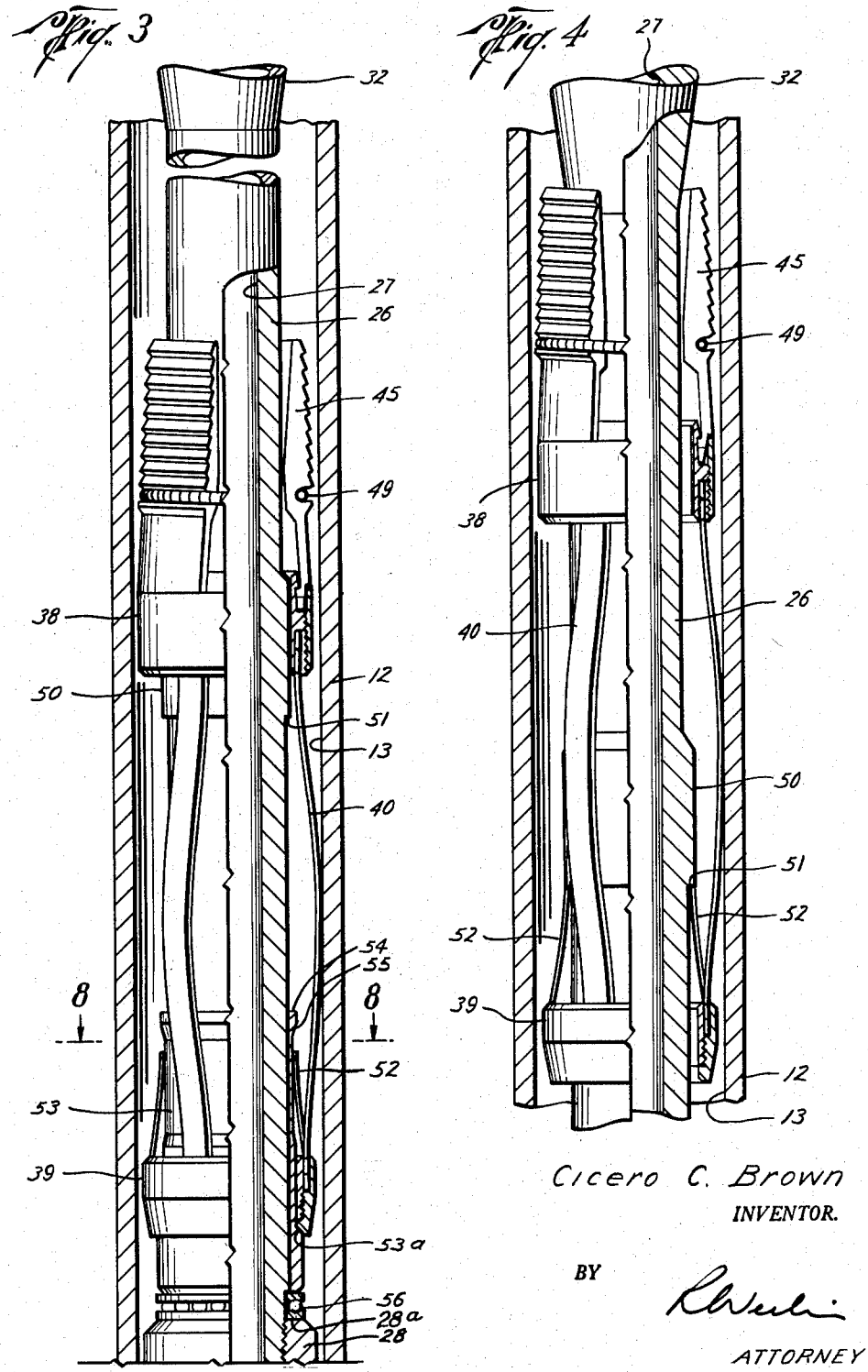

Jan. 20, 1959　　　C. C. BROWN　　　2,869,644
WASHOVER TOOL FOR USE IN WELLS
Filed May 31, 1955　　　　　　　　　5 Sheets-Sheet 4
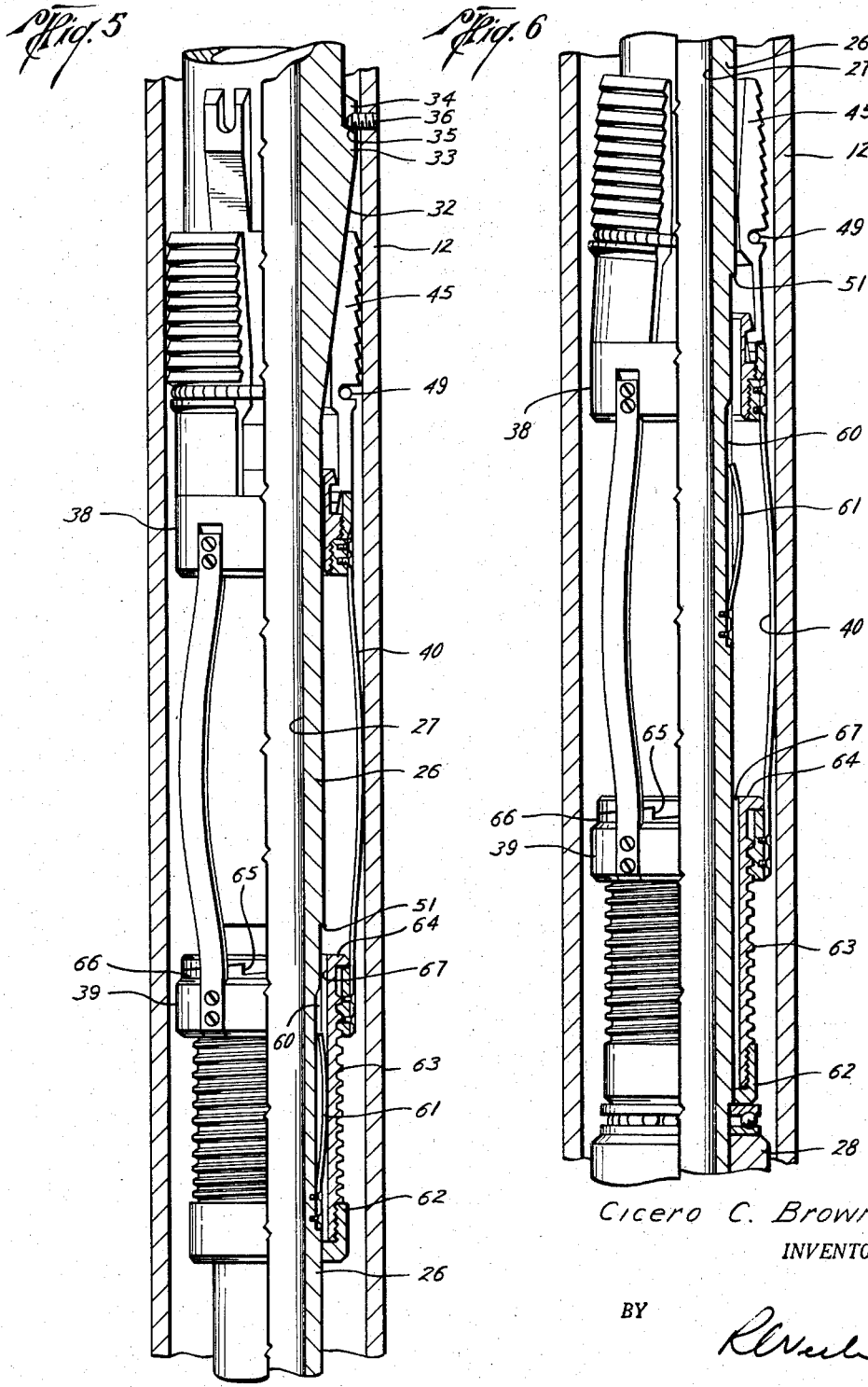
Cicero C. Brown
INVENTOR.
BY
ATTORNEY Jan. 20, 1959 C. C. BROWN 2,869,644
WASHOVER TOOL FOR USE IN WELLS
Filed May 31, 1955 5 Sheets-Sheet 5

Cicero C. Brown
INVENTOR.

BY
ATTORNEY

United States Patent Office 2,869,644
Patented Jan. 20, 1959

2,869,644

WASHOVER TOOL FOR USE IN WELLS

Cicero C. Brown, Houston, Tex.

Application May 31, 1955, Serial No. 512,197

7 Claims. (Cl. 166—103)

This invention relates to fishing tools of the type employed in wells, such as oil wells, for the release and recovery of stuck pipe, lost drilling tools, and the like.

More particularly, this invention is directed to a form of fishing tool commonly referred to as a "washover" tool.

Washover tools of the type contemplated by the present invention generally comprise an elongated tubular sleeve which is attached to an operating pipe and which is adapted to be worked down around and over the end of the pipe or tool which is stuck in the well. The lower end of the washover tool is ordinarily provided with a shoe having cutting teeth and is operated as a form of drill which is rotated about the exterior of the "fish," the combination of the drilling action of the washover pipe and of hydraulic fluid circulating through washover pipe serving to release the stuck or lost tool or pipe string.

These washover tools ordinarily include some form of gripping device for attachment to the fish, so that the latter may be withdrawn when it has been released by the action of the washover tool.

The present invention is directed to improvements in the general type of washover tool described and has for its primary object the provision of a washover tool which is relatively simple in construction and which may be operated by a series of relative simple and uncomplicated manipulations of the operating pipe.

An important object is the provision of a washover tool having internally thereof an improved form of mandrel including a catcher device for automatically grasping the stuck object when it is released.

Washover tools ordinarily include a washover sleeve or pipe which is several hundred feet in length, 600 feet being a conventional length for such tools. Since the washover tool will be rotated and raised and lowered by corresponding manipulation of an operating pipe string which extends to the surface, it will be obvious that there will be many occasions when the length of the operating pipe must be increased by the addition of pipe sections, which are usually about thirty feet in length, while the catcher remains secured to the fish.

The present invention provides means whereby the operating string may be raised as required while the catcher mandrel remains secured to the fish.

Another object is to provide a washover tool having releasable connection means between the washover pipe and the catcher mandrel operable by longitudinal reciprocating movements of the operating string connected to the washover pipe.

A further object is to provide a washover tool having releasable connection means between the washover pipe and the catcher mandrel operable by rotation of the washover pipe in a direction reverse to that employed during the washover operation.

Other and more specific objects and advantages of this invention will become more readily apparent from the following detailed description when read in conjunction with the accompanying drawing which illustrate several useful embodiments in accordance with this invention.

In the drawing:

Fig. 1 is an elevational view, partly in section, showing the washover tool in operating position in a well;

Figs. 2A, 2B and 2C, together, comprise a longitudinal partly sectional view of a washover tool in accordance with one embodiment of this invention, the parts of the tool being shown in inactive positions while the tool is being run into the well;

Fig. 3 is a view of one embodiment of the catcher portion of the device illustrated in Figs. 2A, 2B, and 2C showing the catcher parts in active catching position;

Fig. 4 is a view similar to Fig. 3 showing the catcher portion locked in inactive position;

Fig. 5 is a view similar to Figs. 3 and 4 illustrative of another embodiment of the catcher element, the parts being shown in the positions occupied when the washover tool is being run into the well;

Fig. 6 is another view of the embodiment of Fig. 5 showing the catcher parts in active catching position;

Figure 7:
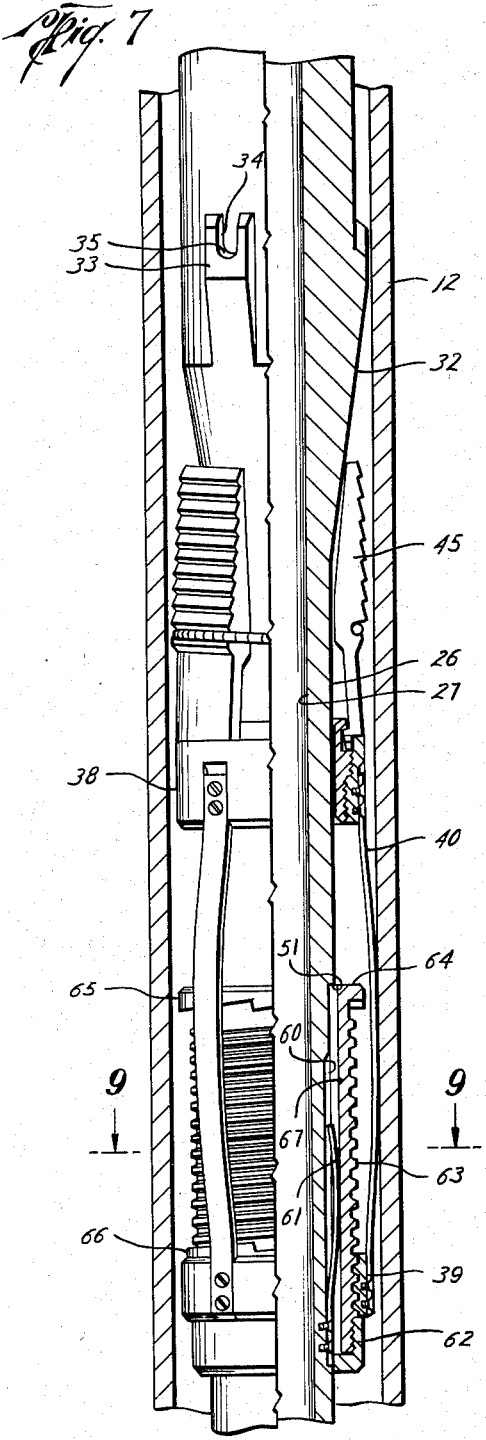
Figure 8:
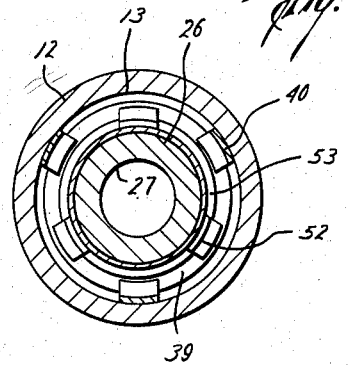
Figure 9:
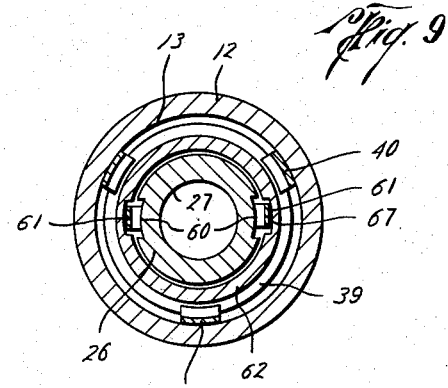

Fig. 7 is an additional view of the embodiment of Fig. 5 showing the catcher parts locked in inactive position; and Figs. 8 and 9 are transverse cross-sections taken respectively on line 8—8 of Fig. 3 and line 9—9 of Fig. 7.

Referring to the drawing, Fig. 1 shows a washover tool, designated generally by the numeral 10, secured to an operating pipe P and inserted in the bore of a well W. The tool is shown with the mandrel of its catcher element, designated generally by the numeral 11, secured to a fish F, which may be a portion of string of drill pipe which has become stuck in the well by the caving in of the well wall, as indicated at C, the parts of the washover tool being shown in the positions occupied during active washover operations.

Figure 2B:
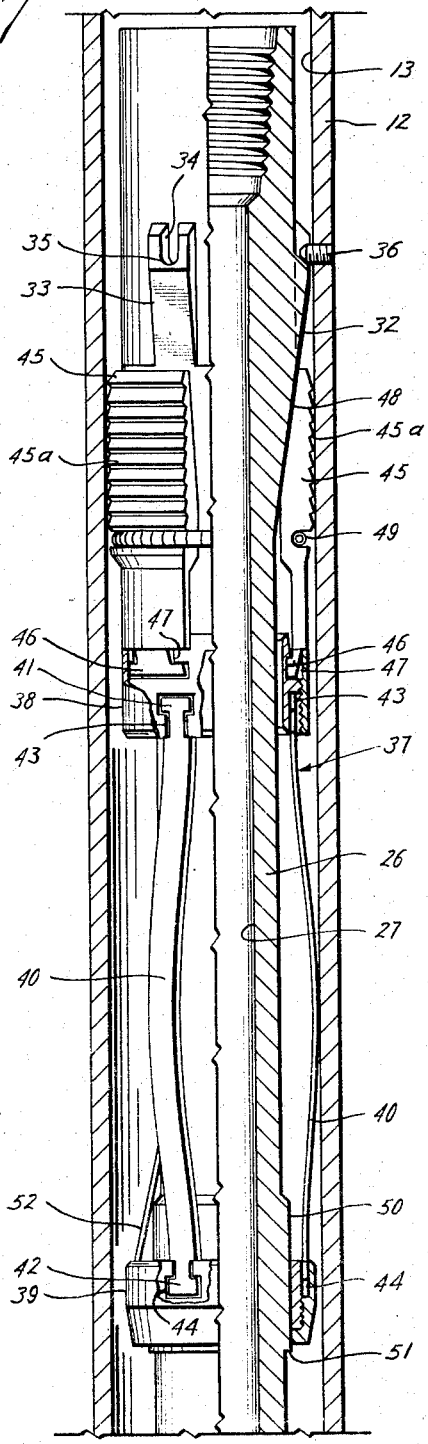
Figure 2C:
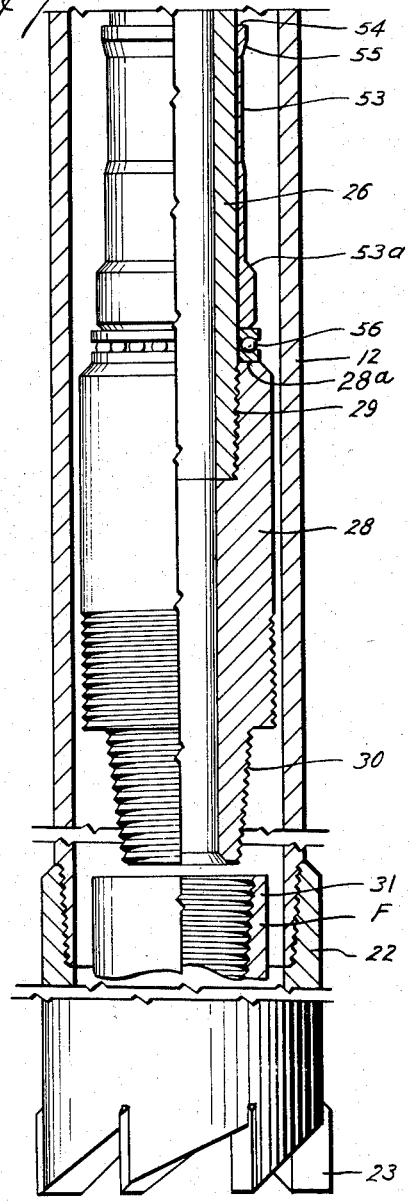

Referring now to Figs. 2A, 2B and 2C, the washover tool comprises the elongated washover pipe 12 having the bore 13, the diameter of which is sufficiently larger than the external diameter of the fish F to permit the washover pipe to pass freely over and around the fish between the wall of bore 13 and the fish during washover operations.

Washover pipe 12 will usually be made up of a plurality of co-axially connected pipe sections to provide the desired overall length which, as indicated above, will usually be several hundred feet. The end of the washover pipe may be connected to operating pipe P by means of a safety joint, designated generally by the numeral 14, which may be of any suitable and generally conventional construction, the details of which do not form a part of the present invention. By way of example, however, the form of safety joint illustrated comprises an outer sleeve or socket member 15, which is secured in any suitable manner to the upper end of washover pipe 12, and a pin member 16 which is slidably inserted into the bore of socket 15 and locked thereto by means of a breakable shear ring 17. The upper end of pin member 16 carries an internally threaded box 18 adapted to threadedly receive the usual threaded pin 19 carried by the lower end of operating pipe P, thereby providing the means for connecting the washover tool to the operating pipe string. A releasable bayonet type connection is also provided between the pin and socket members of the safety joint which may be operated after shear ring 17 has been broken by appropriate pull on pipe P. The bayonet-type connection includes the radially projecting lugs 20—20 mounted on the inner wall of socket member 15 and adapted to project into cooperating bayonet or Jay-slots 21—21 formed on the exterior of pin member 16. The Jay-slots may be formed, as illustrated, to permit limited relative longitudinal movement between the pin and socket members without their complete separation or, upon a limited amount of relative rotational movement, the pin and socket members may be completely released from each other and the operating pipe thereby completely disengaged from the washover tool.

The lower end of washover pipe 12 has threadedly secured thereto a tubular shoe 22 which carries at its lower end a plurality of annularly arranged, circumferentially spaced cutting teeth 23 of any suitable form adapted to drill or cut away earth formations surrounding the fish F as the washover pipe is advanced about the exterior of the fish. Bore 13 of the washover pipe communicates at its upper end with the bore 24 in the operating pipe through an axial passage 25 provided in pin member 16 of the safety joint. It will be understood that drilling fluid of any suitable character will ordinarily be circulated downwardly through the operating pipe and the interior of the washover pipe to aid in drilling about and washing over the fish in accordance with conventional practice.

The catcher mandrel 11 is mounted in the bore of washover pipe 12 and includes the tubular stem 26 having the axial bore 27 extending entirely therethrough. The lower end of stem 26 has secured thereto a connector or grapple means 28 of any suitable and generally conventional form adapted for connecting the catcher mandrel to the fish. In the form illustrated, grapple means 28 is a tubular sub having a threaded socket 29 at its upper end to threadedly receive the lower end of stem 26 and carrying on its lower end a tapered externally threaded pin 30 adapted to be screwed into the internally threaded collar or box 31 carried by the upper end of the fish. Ordinarily, if the fish is a section of the drill pipe which has become stuck, as much as possible of the drill pipe above the stuck point will be unscrewed, leaving the threaded box or collar 31 as the uppermost end member of the fish and thereby available for connection to the catcher mandrel by means of a threaded pin, such as pin 30. It will be understood, of course, that grapple means 28 may be any other conventional form of spear or internal grapple which could be inserted into the bore of the fish in order to effectively grasp the same. It may also be an overshot or external grapple of one of the various conventional forms well-known in the art for grasping objects such as the fish F.

The upper end of stem 26 carries an external enlargement in the form of a downwardly tapering conical surface 32 which will function as a slip expander, as will be described more fully hereinafter. The upper end of expander 32 may be provided with a plurality of angularly spaced upward extensions 33 notched downwardly from their upper ends at 34, the bottoms of the notches defining shoulders 35 which are adapted to be engaged by breakable shear screws 36 extending radially through the wall of washover pipe 12 and projecting into notches 34. Slidably mounted on the exterior of stem 26 between the upper end of tool 28 and expander 32 is a slip assembly, designated generally by the numeral 37, adapted to form a releasable connection between washover pipe 12 and catcher mandrel 11.

Slip assembly 37 comprises upper and lower longitudinally spaced collars 38 and 39, respectively, which are connected together by means of a number of circumferentially spaced, outwardly bowed drag springs 40 adapted to frictionally engage the wall of bore 13 of the washover pipe. The opposite ends of the drag springs carry T-heads 41 and 42 which fit loosely in correspondingly shaped slots 43 and 44 in respective collars, the loose fit permitting longitudinal movement of the ends of the drag springs when the springs are subjected to radial contraction and expansion during the operation. The spaced collars and connecting drag springs form a slip cage or slip support. A plurality of wedges or slips 45 are arranged about the exterior of expander 32 and have their lower ends provided with T-heads 46 hingedly secured in correspondingly shaped sockets 47 provided in the upper end of upper collar 38 whereby to permit a limited degree of radial movement of the slips. The outer faces of the slips are provided with pipe-engaging teeth 45a and the inner faces of the slips are provided with tapered surfaces 48 complementary to the taper of expander 32. A garter spring 49 encircles the group of slips 45 and normally tends to urge them radially inwardly away from the wall of washover pipe 12. With the arrangement shown, it will be seen that relative movement of the expander and slips toward each other will serve to urge the slips outwardly into gripping engagement with the inner wall of washover pipe 12, while the opposite relative movement between these parts will serve to disengage the slips from the wall of the washover pipe aided by the constrictive pressure of garter spring 49.

Stem 26 has formed at a point intermediate its ends an enlargement 50 which defines at its lower end a downwardly facing annular shoulder 51 which is spaced some distance above the upper end of grapple means 28, which defines an upwardly facing abutment or shoulder 28a about the lower end of stem 26. The bores of collars 38 and 39 are made large enough to allow these collars to pass over enlargement 50. Lower collar 39 carries a plurality of angularly spaced resilient detents or pawls 52 which project inwardly from the collar to normally resiliently bear against the exterior surface of stem 26. The free ends of pawls 52 are designed to cooperate with shoulder 51 in operation of the device, as will be described more fully hereinafter.

Slidably mounted on the portion of stem 26 extending between shoulder 51 and the upper end of grapple means 28 is a releasing sleeve 53 having an annularly thickened portion at its upper end forming an upwardly facing shoulder 54 which merges into a downwardly and inwardly tapering peripheral surface 55. The external diameter of shoulder 54 is made at least as large as that of enlargement 50 and slightly less than the internal diameter of lower collar 39 so that the latter will pass over shoulder 54, for purposes which will appear more fully hereinafter. An anti-friction bearing, such as the ball bearing 56, is positioned between shoulder 28a formed by the upper end of tool 28 and the lower end of sleeve 53.

Preparatory to operation, the washover tool is assembled as illustrated in Figs. 2A to 2C. In this initial assembly, washover pipe 12 will be drawn upwardly over mandrel 11 to draw slips 45 upwardly into wedging engagement between expander 32 and the wall of the washover pipe. The drag of springs 40 on washover pipe 12 will cause the slips to move upwardly with the washover pipe relative to the mandrel in order to set the slips into the wall of the washover pipe. When the slips have been pulled up sufficiently strongly to set them properly, and while tension is maintained between the washover pipe and the mandrel, shear screws 36 will be inserted through the wall of the washover pipe to engage shoulders 35, thereby effectively locking the mandrel, slips and washover pipe into a unitary structure, since with the shear screws in place, washover pipe 12 cannot move downwardly relative to the mandrel to release the slips.

With the mandrel thus locked to the washover pipe, the tool is connected, by means of safety joint 14, to operating pipe P and is run into the well. The lower end of the washover pipe carrying the cutter shoe 22 will be worked over the end of the fish and washed down until the grapple means has grasped the fish, in this case, until pin member 30 is received in collar 31. Washover pipe 12 will be rotated in order to screw grapple means 28 tightly into the fish and thereby secure the catcher mandrel to the fish. When this occurs, operating pipe P will be lowered sufficient to apply enough weight to shear screws 36 to break the shear screws and release the washover pipe from the mandrel. Thereupon, the washover pipe will be rotated and moved downwardly in the usual washover operation to cut away the earth material or other debris which has caused the fish to be stuck in the well bore. As the washover pipe moves down, it will, of course, draw the slips 45 down with it by reason of the frictional engagement of drag springs 40 with the inner wall of the washover pipe, and will pull the slips downwardly off of expander 32 which is stationary because of its attachment through stem 26 to the fish. When the slips have thus been released, the entire slip assembly is free to slide down stem 26 and will ordinarily do so, lower collar 39 sliding down over the exterior of releasing sleeve 53 to the position illustrated particularly in Fig. 3, and coming to rest against a shoulder 53a near the lower end of sleeve 53. In this position, it will be noted that pawls 52 are positioned against the exterior of sleeve 53 below shoulder 54 and tapered surface 55.

With the washover pipe thus released from its connection to the mandrel, the washover pipe may be driven downwardly by rotation of the operating string and washing action of the wash fluid until the obstacle in the well bore, such as the caved section C, has been cut away in order to free the fish. In the event the fish has been stuck in such a manner that its lower end is above the bottom of the well bore, the fish will, of course, tend to fall to the bottom as soon as the sticking obstacle has been cut away. However, the catcher means provided by this invention will operate automatically to catch the fish and prevent its falling to the bottom of the well, the automatic operation being substantially as follows: As the fish starts to fall, it will pull the mandrel downwardly relative to slips 45 which will be held against downward movement by the frictional drag of springs 40 on the wall of washover pipe 12. As soon as the descent of the fish has drawn expander 32 inside the slips, the latter will be immediately expanded and caused to wedge between the expander and the washover pipe and to tightly grip the latter, thereby preventing further falling of the fish. With the fish thus effectively secured to the washover pipe, the latter may be withdrawn from the well by pull applied to the operating pipe and the fish drawn from the well along with the washover tool.

Where the fish is already in contact with the well bottom, then, once it has been freed from the material causing it to be stuck, it will only be necessary to pull upwardly on the washover pipe which will carry the slips with it until they wedge about expander 32 and again lock the fish to the washover pipe, which may then be withdrawn from the well in order to pull the fish from the well.

It will be understood that the upward movement of the washover pipe relative to the mandrel in either of the above cited instances, will draw releasing sleeve 53 upwardly against shoulder 51 by reason of frictional engagement of pawls 52 with the exterior surface of the releasing sleeve. When shoulder 54 on the releasing sleeve strikes shoulder 51, the continued upward movement of the washover pipe will, by reason of the frictional engagement with drag springs 40, pull lower collar 39 and pawls 52 upwardly over tapered surface 55 and on to the exterior of enlargement 50 over which pawls 52 will be drawn upwardly until it is above the enlargement, or until the slips have been set between expander 32 and the washover pipe. As soon as pawls 52 have been pulled off of releasing sleeve 53, as described, the latter will simply slide back down the exterior of stem 26 to its original position illustrated in Fig. 2C.

However, if during the washover operation, it becomes necessary for any reason to raise the washover pipe, as when an additional section of operating pipe is to be inserted at the surface, it will obviously be necessary to prevent slips 45 from moving upwardly into anchoring engagement between the catcher mandrel and the washover pipe. This will be accomplished in the following manner, starting with the parts in the normal washover position, illustrated particularly in Fig. 3: In this position, as previously described, the slips will be in their downward position with pawls 52 bearing against the exterior of releasing sleeve 53 below shoulder 54. The washover pipe will then be raised until the pawls are again pulled up over enlargement 50, as previously described, but not far enough to cause the slips to be set. As soon as pawls 52 have passed over shoulder 54 and are resting on enlargement 50, the releasing sleeve will be freed and will again drop to its inactive position illustrated in Fig. 2C. The washover pipe will then be lowered carrying the slip assembly downwardly with it until pawls 52 have been moved to a point below shoulder 51, thereupon upward movement of the washover pipe will cause pawls 52 to engage beneath shoulder 51 and lock the slips against upward movement relative to the mandrel, as illustrated particularly in Fig. 4. In this position washover pipe 12 may be moved upwardly relative to the mandrel and the fish such distance as may be necessary without causing setting of the slips. Upon completion of the operation, such as the addition of a pipe section to pipe string P, washover pipe 12 may again be lowered, moving the slip assembly downwardly, until pawls 52 have again passed over the exterior of releasing sleeve 53 to the position illustrated in Fig. 3, whereupon the washover operation may be continued. By means of the slip control elements described, it will be seen that release and engagement of the connection between the washover pipe and the mandrel, as formed by the wedging action of the slips, may be effected entirely by a series of longitudinal reciprocating movements which can be very easily accomplished at the surface with a minimum of difficulty and affords maximum flexibility in connecting and disconnecting the washover pipe from the fish as may be required during the course of the washover operation.

Figs. 5, 6 and 7 illustrate another embodiment of a washover tool in which all of the parts are substantially identical with those of the previously described embodiment except for the structure of the releasing sleeve and its operation. For this reason, only a portion of the device, which includes the slip assembly and releasing sleeve is illustrated, and its parts which are identical with the parts of the previously described embodiment are designated by the same numerals. In this embodiment, the portion of stem 26 below shoulder 51 is modified to provide a plurality of longitudinally extending circumferentially spaced slots 60 in the exterior surface of the stem. An outwardly bowed leaf spring 61 is mounted in each of the slots 60 with its lower end fixedly secured to stem 26, the free ends of the springs 61 being longitudinally movable in the slots in accordance with the radial compression and expansion of the springs 61. Slidably mounted on the exterior of stem 26 below shoulder 51 is a sleeve 62 carrying external threads 63 which are turned in a direction opposing the direction of rotation of the washover pipe in its washover operations. The upper end of sleeve 62 extends through the bore of lower collar 39 and is provided with an overhanging lip 64 defining a clutch member 65 adapted to cooperate with a complementary clutch member 66 carried on the upper end of collar 39, as illustrated particularly in Fig. 5. The bore of sleeve 62 is provided with a plurality of longitudinally milled slots 67 adapted to register with slots 60 and to receive the outwardly bowed portions of springs 61 when the sleeve is positioned opposite the latter.

In the position illustrated in Fig. 5, the parts are shown as assembled when the tool is being lowered into the well; that is, the mandrel is locked to the washover pipe by the wedging engagement of slips 45, the parts being held in this position by means of the shear screws 36. Also, in this position, clutch members 65 and 66 will be engaged so that when washover pipe 12 is rotated in order to secure the grapple means 28 (Fig. 6) to the fish, in the manner previously described, there can be no relative movement between stem 26, sleeve 62 and collar 39, since springs 61 extend partially into slots 60 and partially into slots 67, forming a connection between the stem and releasing sleeve 62 which will prevent relative rotation therebetween.

When the grapple means has been secured to the fish by rotation of the entire tool, as previously described, weight will then be applied through the washover pipe to break shear screws 36 and permit downward movement of the washover pipe relative to the mandrel, thereby dragging slips 45 downwardly away from expander 32, as previously described, and releasing the washover pipe for its downward rotative movements required for effecting the washover operations. When the slips are thus released, the entire slip assembly, including sleeve 62, will slide down the surface of stem 26 to the position illustrated in Fig. 6, at which point springs 61 will have moved out of engagement with slots 67. When it is desired to move washover pipe 12 upwardly without setting the slips, the operating pipe will be drawn upwardly a pre-determined distance sufficient to cause the washover pipe, acting through the friction of drag springs 40, to raise the slip assembly sufficiently to re-engage springs 61 in slots 67, this distance being less than that required to bring slips 45 into wedging engagement between the expander and the washover pipe. The washover pipe will then be rotated in the direction of rotation normally employed in the washover operations, and this rotative movement, again acting through the engagement of washover pipe 12 with drag springs 40, will cause collar 39 to move downwardly along sleeve 62, as illustrated particularly in Fig. 7, while at the same time the sleeve will move upwardly along stem 26 until the upper end 64 of the sleeve abuts shoulder 51. This will limit the upward movement of the slips relative to the mandrel and will prevent the slips being set while the washover pipe is raised sufficiently to accomplish the purposes previously described. When washover operations are to be resumed, rotation of the washover pipe in the normal direction employed in the washover operations will again retract collar 39 along sleeve 62 until clutch elements 66 and 65 are again engaged. Downward movement of the washover pipe will, of course, carry the sleeve assembly downwardly with it away from expander 32. When it is necessary to release the washover pipe relative to the expander, the previously described operations will be repeated. The embodiment illustrated in Figs. 5, 6 and 7, therefore, are an alternative arrangement for preventing engagement of the latch or lock between the washover pipe and the mandrel when upward movement of the washover pipe relative to the fish is desired.

It will be understood that various alterations and modifications may be made in the details of the illustrative embodiments within the scope of the appended claims but without departing from the spirit of this invention.

What I claim and desire to secure by Letters Patent is:

1. A washover tool for use in a well to release objects stuck therein, comprising, an elongate washover pipe having a bore adapted to receive an object stuck in a well as the washover pipe is worked downwardly about the object, a tubular mandrel movably disposed axially of said bore and connectible to said object, slip support means slidably mounted on the mandrel and having frictional engagement with the bore wall of the washover pipe, radially movable wedge slips mounted on the slip support means, slip expander means mounted on the mandrel expandibly engageable with the slips in response to relative axial movement toward each other of the slips and the expander means to move said slips into wedging engagement with said washover pipe whereby to secure the washover pipe against upward movement relative latch means carried by the slip support means and operable upon manipulation of the washover pipe to releasably position the slips below the point of wedging engagement with the slip expander means, and releasable means carried by the washover pipe arranged to initially hold said slips in wedged engagement between the slip expander means and the washover pipe to thereby initially anchor the mandrel to the washover pipe.

2. A washover tool for use in a well to release objects stuck therein, comprising, an elongate washover pipe having a bore adapted to receive an object stuck in a well as the washover pipe is worked downwardly about the object, a tubular mandrel movably disposed axially of said bore and connectible to said object, slip support means slidably mounted on the mandrel and having frictional engagement with the bore wall of the washover pipe, radially movable wedge slips mounted on the slip support means, slip expander means mounted on the mandrel expandibly engageable with the slips in response to relative axial movement toward each other of the slips and the expander means to move said slips into wedging engagement with said washover pipe whereby to secure the washover pipe against upward movement relative to the mandrel, fixed stop means on the mandrel below the slip expander means, releasable stop engaging means mounted on the slip support means releasably engaged with said fixed stop means whereby to hold the slips away from wedging engagement with the slip expander means, release means movably mounted on the mandrel and operable upon manipulation of the washover pipe to release said stop-engaging means from said fixed stop means, and releasable means carried by the washover pipe arranged to initially hold said slips in wedged engagement between the slip expander means and the washover pipe to thereby initially anchor the mandrel to the washover pipe.

3. A washover tool as defined by claim 2, wherein said releasable stop engaging means comprise resilient pawls, and wherein said release means comprises a tubular sleeve movable between the pawls and the mandrel to spread said pawls sufficiently to clear said fixed stop means.

4. A washover tool as defined by claim 2, wherein said releasable stop engaging means comprises an externally threaded sleeve member slidable on the mandrel and an internally threaded collar member on said slip support means threadedly mounted on said sleeve and operable in response to rotation of the washover pipe to move said slips to and from positions engageable by said expander means when the sleeve member is engaged with the fixed stop means.

5. A washover tool for use in a well to release objects stuck therein, comprising, an elongate washover pipe having a bore adapted to receive an object stuck in a well as the washover pipe is worked downwardly about the object, a tubular mandrel movably disposed axially of said bore and connectible to said object, tubular slip support means slidably mounted on the mandrel, said slip support means including upper and lower longitudinally spaced collars and spring means connecting the collars and frictionally engaged with the bore wall of the washover pipe, wedge slips positioned about the mandrel above the support means and having their lower ends hingedly connected to the upper collar for radial movement relative thereto, a downwardly tapering frusto-conical slip expander means mounted on the mandrel above the slips movable into expandible engagement therewith in response to relative axial movement toward the slips to move said slips into wedging engagement with said washover pipe whereby to secure the washover pipe against upward movement relative to the mandrel, a downwardly facing external shoulder on the mandrel below said expander means, resilient pawls extending upwardly and inwardly from the lower collar to engage beneath said shoulder whereby to latch said slips against relative movement toward said expander means in order to free the washover pipe for upward movement relative to the mandrel, a tubular releasing sleeve movably mounted on said mandrel below said shoulder and movable upon longitudinal movement of the washover pipe into spreading engagement with said pawls whereby to release said pawls from said shoulder in order to free said slips for relative axial movement toward said expander means, and releasable means carried by the washover pipe arranged to initially hold said slips in wedged engagement between the slip expander means and washover pipe to thereby initially anchor the mandrel to the washover pipe.

6. A washover tool for use in a well to release objects stuck therein, comprising, an elongate washover pipe having a bore adapted to receive the end of an object stuck in a well, a tubular mandrel axially disposed in the bore of the washover pipe, grapple means carried by the lower end of the mandrel for securing the mandrel to said object, a slip cage slidably mounted on the mandrel and carrying resilient means frictionally engaging the bore wall of the washover pipe, a plurality of radially movable pipe-gripping slips supported by the slip cage, slip expander means mounted on the mandrel to expansibly engage said slips in response to relative movement toward each other of the expander and the slips to move said slips into wedging engagement with said washover pipe, cooperating latch means comprising shoulder means on the mandrel and shoulder-engaging means on the slip cage for releasably holding the slips out of engagement with the washover pipe during relative upward movement of the washover pipe, latch release means movably connected on the mandrel and operable solely by longitudinal manipulation of the washover pipe to release said shoulder-engaging means from said shoulder means, and releasable means carried by the washover pipe arranged to initially hold said slips in wedged engagement between the slip expander means and washover pipe to thereby initially anchor the mandrel to the washover pipe.

7. A washover tool for use in a well to release objects stuck therein, comprising, an elongate washover pipe having a bore adapted to receive an object stuck in a well as the washover pipe is worked downwardly about said object, a tubular mandrel movably disposed axially of said bore and connectible to said object, slip support means slidably mounted on the mandrel and having frictional engagement with the bore wall of the washover pipe, radially movable wedge slips mounted on the slip support means, slip expander means mounted on the mandrel expandibly engageable with the slips in response to unrestricted relative axial movement toward each other of the slips and the expander means to move said slips into wedging engagement with said washover pipe whereby to secure the washover pipe against upward movement relative to the mandrel, fixed stop means on the mandrel engageable with the slip support means to hold said slips out of engagement with said expander means whereby to permit the washover pipe to move upwardly relative to the mandrel, release means mounted on the mandrel and operable upon manipulation of the washover pipe to release said slip support means from engagement with said fixed stop means, and releasable means carried by the washover pipe arranged to initially hold said slips in wedged engagement between the slip expander means and the washover pipe to thereby initially anchor the mandrel to the washover pipe.

References Cited in the file of this patent

UNITED STATES PATENTS

| | | |
|---|---|---|
| 2,449,841 | Claypool et al. | Sept. 21, 1948 |
| 2,577,605 | Clayton | Dec. 4, 1951 |
| 2,647,008 | Stewart et al. | July 28, 1953 |
| 2,762,438 | Naylor | Sept. 11, 1956 |
| 2,771,957 | Weber | Nov. 27, 1956 |
| 2,804,151 | LeBus | Aug. 27, 1957 |

UNITED STATES PATENT OFFICE

CERTIFICATE OF CORRECTION

Patent No. 2,869,644 January 20, 1959

Cicero C. Brown

It is hereby certified that error appears in the printed specification of the above numbered patent requiring correction and that the said Letters Patent should read as corrected below.

Column 7, line 69, after "relative" insert -- to the mandrel, --.

Signed and sealed this 12th day of May 1959.

(SEAL)
Attest:

KARL H. AXLINE
Attesting Officer

ROBERT C. WATSON
Commissioner of Patents